(12) United States Patent
Liao

(10) Patent No.: US 9,578,368 B2
(45) Date of Patent: Feb. 21, 2017

(54) METHOD AND DATA PROCESSING APPARATUS SUPPORTING SIMULTANEOUS PLAYBACK

(71) Applicant: MStar Semiconductor, Inc., Hsinchu, Hsien (TW)

(72) Inventor: Wen-Jung Liao, Hsinchu (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 14/799,162

(22) Filed: Jul. 14, 2015

(65) Prior Publication Data
US 2016/0330506 A1 Nov. 10, 2016

(30) Foreign Application Priority Data

May 7, 2015 (TW) .............................. 104114599 A

(51) Int. Cl.
| | |
|---|---|
| H04N 21/426 | (2011.01) |
| H04N 21/482 | (2011.01) |
| H04N 21/488 | (2011.01) |
| H04N 21/41 | (2011.01) |
| H04N 21/437 | (2011.01) |
| H04N 21/462 | (2011.01) |

(52) U.S. Cl.
CPC ...... *H04N 21/4263* (2013.01); *H04N 21/4126* (2013.01); *H04N 21/437* (2013.01); *H04N 21/4622* (2013.01); *H04N 21/482* (2013.01); *H04N 21/4884* (2013.01)

(58) Field of Classification Search
CPC combination set(s) only.
See application file for complete search history.

(56) References Cited

U.S. PATENT DOCUMENTS

| | | | |
|---|---|---|---|
| 7,797,004 B2 * | 9/2010 | Patel | G06Q 20/40 455/41.2 |
| 8,060,910 B2 * | 11/2011 | Cruz | H04N 21/4122 725/100 |
| 2011/0167447 A1 * | 7/2011 | Wong | H04N 21/42208 725/40 |

FOREIGN PATENT DOCUMENTS

| | | |
|---|---|---|
| CN | 1890967 B | 11/2010 |
| CN | 101803373 B | 8/2012 |
| CN | 103716674 A | 4/2014 |

OTHER PUBLICATIONS

Taiwan Patent Office "Office Action" issued on Mar. 28, 2016, Taiwan.

* cited by examiner

*Primary Examiner* — Mulugeta Mengesha
(74) *Attorney, Agent, or Firm* — WPAT, PC; Justin King; Douglas Hosack

(57) ABSTRACT

A data processing apparatus supporting simultaneous playback includes a processor, two tuners, a receiving element and a transmitting element. The first tuner generates first television data transmitted via a first frequency range, and provides the first television data to an internal playback device. The second tuner generates second television data transmitted via a second frequency range. The receiving element receives a data request for a selected television channel from an external electronic device. In response to the data request, the processor controls the second tuner to generate the second television data including video/audio data of the selected television channel. When the internal playback device performs playback according to the first television data, the transmitting element transmits the video/audio data of the selected television channel to the external electronic device for playback.

8 Claims, 7 Drawing Sheets

METHOD AND DATA PROCESSING APPARATUS SUPPORTING SIMULTANEOUS PLAYBACK

This application claims the benefit of Taiwan application Serial No. 104114599, filed May 7, 2015, the subject matter of which is incorporated herein by reference.

BACKGROUND OF THE INVENTION

Field of the Invention

The invention relates in general to televisions, and more particularly to a technology capable of simultaneously playing multiple television channels.

Description of the Related Art

Various handheld mobile devices, such as mobile phones and tablet computers, have become extremely common in the recently years and are essential information receiving channels in the daily lives of many consumers. To enhance entertainment effects and sharing ability, some video/audio transmission standards have become available to allow handheld mobile devices to project screen images to display systems such as televisions or projects having larger display sizes. One focus among these transmission standards is Miracast™. Miracast™, using a wireless local area network (LAN) as a medium, enables an electronic device supporting such standard to share video images through wireless signals. According to this standard, apart from transmitting video images from a mobile device to a television system for display, a television system may also transmit television program images to a mobile device to display the television program images on a screen of the mobile device. Thus, a user is allowed to view television programs through the compact handheld mobile device.

FIG. 1 shows an exemplary functional block diagram of the above transmission architecture for illustrating signal correlation between a television system 100 and an electronic device 150. A tuner 110 receives external television signals. When a user wishes to view a certain television channel using a video/audio playback device 12, an associated instruction may be transmitted through a remote controller or an external key (not shown) of the television system 100. In response to the instruction, a processor 13 sets the tuner 11 to receive data of a frequency range associated with the television channel, prompts a signal processing unit 14 to retrieve video/audio data of the television channel from an output signal of the tuner 11, and performs processes of demodulation, decoding and image optimization on the retrieved video/audio data. A video/audio playback device 12 then receives and plays an output signal from the signal processing unit 14. A receiving element 15 and a transmitting element 16 operate according to the Miracast™ transmission standard. As shown in FIG. 1, a signal transmission line is provided between the signal processing unit 14 and the transmitting element 16. When the receiving element 15 receives a request for obtaining a television program image from the electronic device 150, the processor 130 controls the transmitting element 16 to transmit the output signal of the signal processing unit 14 to the electronic device 140.

The above architecture suffers from one drawback. That is, an image that the television system provides to the handheld mobile device is synchronous with an image that is being played by the television system. In other words, when the television system is playing a program of a certain television channel, a user using the handheld mobile device cannot opt to watch a program of another television channel.

SUMMARY OF THE INVENTION

The invention is directed to a method and a data processing apparatus supporting simultaneous playback of multiple television channels.

According to an example of the present invention, a data processing apparatus supporting simultaneous playback of multiple television channels is provided. The data processing apparatus includes a first tuner, a second tuner, a processor, a receiving element and a transmitting element. The first tuner generates first television data transmitted via a first frequency range, and provides the first television data to an internal playback device for playback. The second tuner generates second television data transmitted via a second frequency range. The receiving element receives a data request for a selected television channel from an external electronic device. In response to the data request for the selected television channel, the processor controls the second tuner to generate the second television data including video/audio data of the selected television channel. When the internal playback device performs playback according to the first television data, the transmitting element transmits the video/audio data of the selected television channel to the external electronic device for playback.

According to another example of the present invention, a method supporting simultaneous playback of multiple television channels is provided. The method is applicable to a data processing apparatus including a first tuner and a second tuner. The method includes following steps. In step (a), first television data transmitted via a first frequency range is generated through the first tuner. In step (b), the first television data is provided to an internal playback device for playback. In step (c), second television data transmitted via a second frequency range is generated through the second tuner. In step (d), a data request for a selected television channel is received from an external electronic device. In step (e), in response to the data request for the selected television program, the second tuner is controlled to generate the second television data including video/audio data of the selected television channel. In step (f), when the internal playback device performs playback according to the first television data, the video/audio data of the selected television channel is transmitted to the external electronic device for playback.

The above and other aspects of the invention will become better understood with regard to the following detailed description of the preferred but non-limiting examples. The following description is made with reference to the accompanying drawings.

Figure 1:
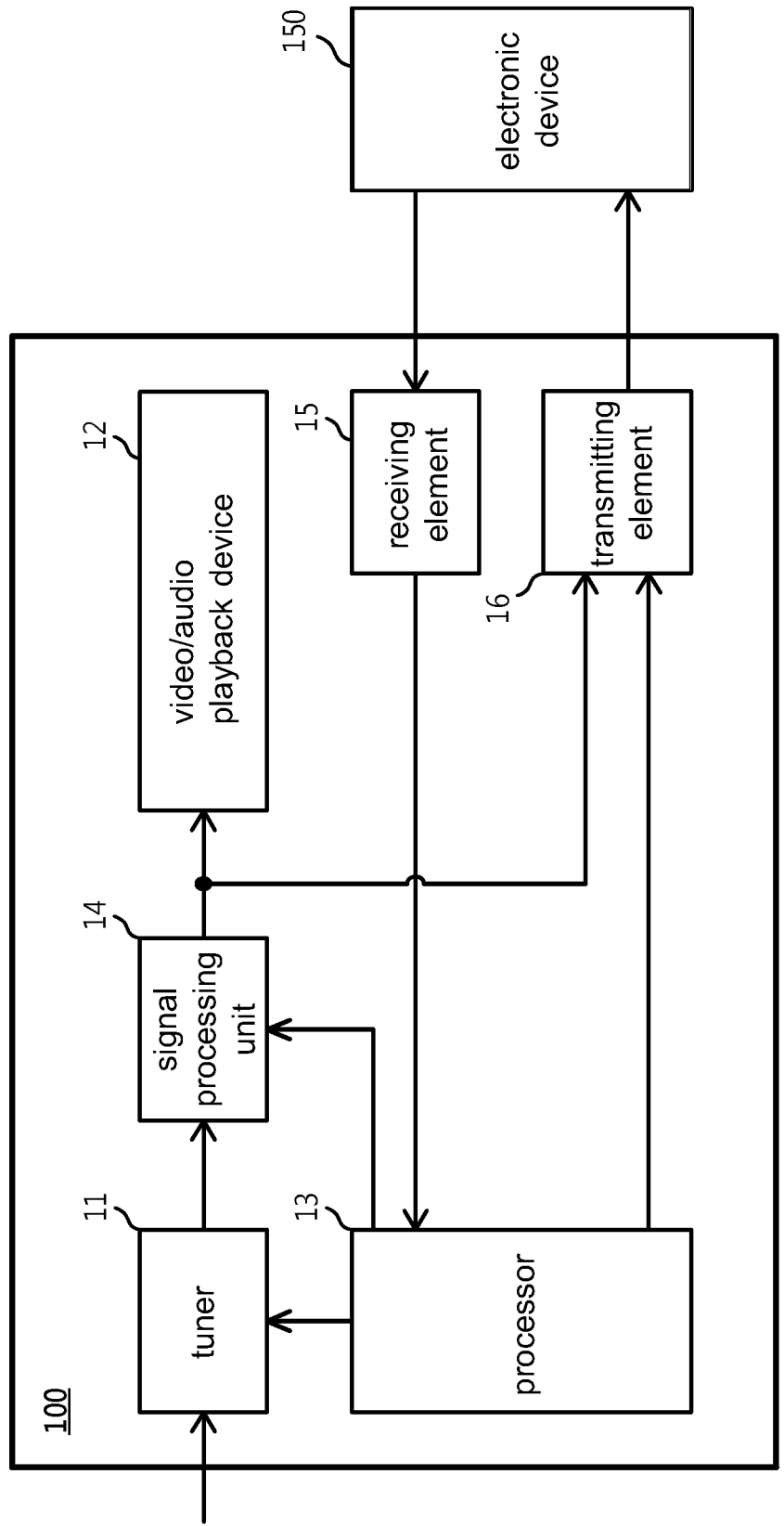
FIG. 1 is an exemplary functional block diagram of conventional transmission architecture for illustrating signal correlation between a television system and an electronic device.

It should be noted that, the drawings of the present invention include functional block diagrams of multiple functional modules related to one another. These drawings are not detailed circuit diagrams, and connection lines therein are for indicating signal flows only. The interactions between the functional elements/or processes are not necessarily achieved through direct electrical connections. Further, functions of the individual elements are not necessarily distributed as depicted in the drawings, and separate blocks are not necessarily implemented by separate electronic elements.

DETAILED DESCRIPTION OF THE INVENTION

Figure 2:
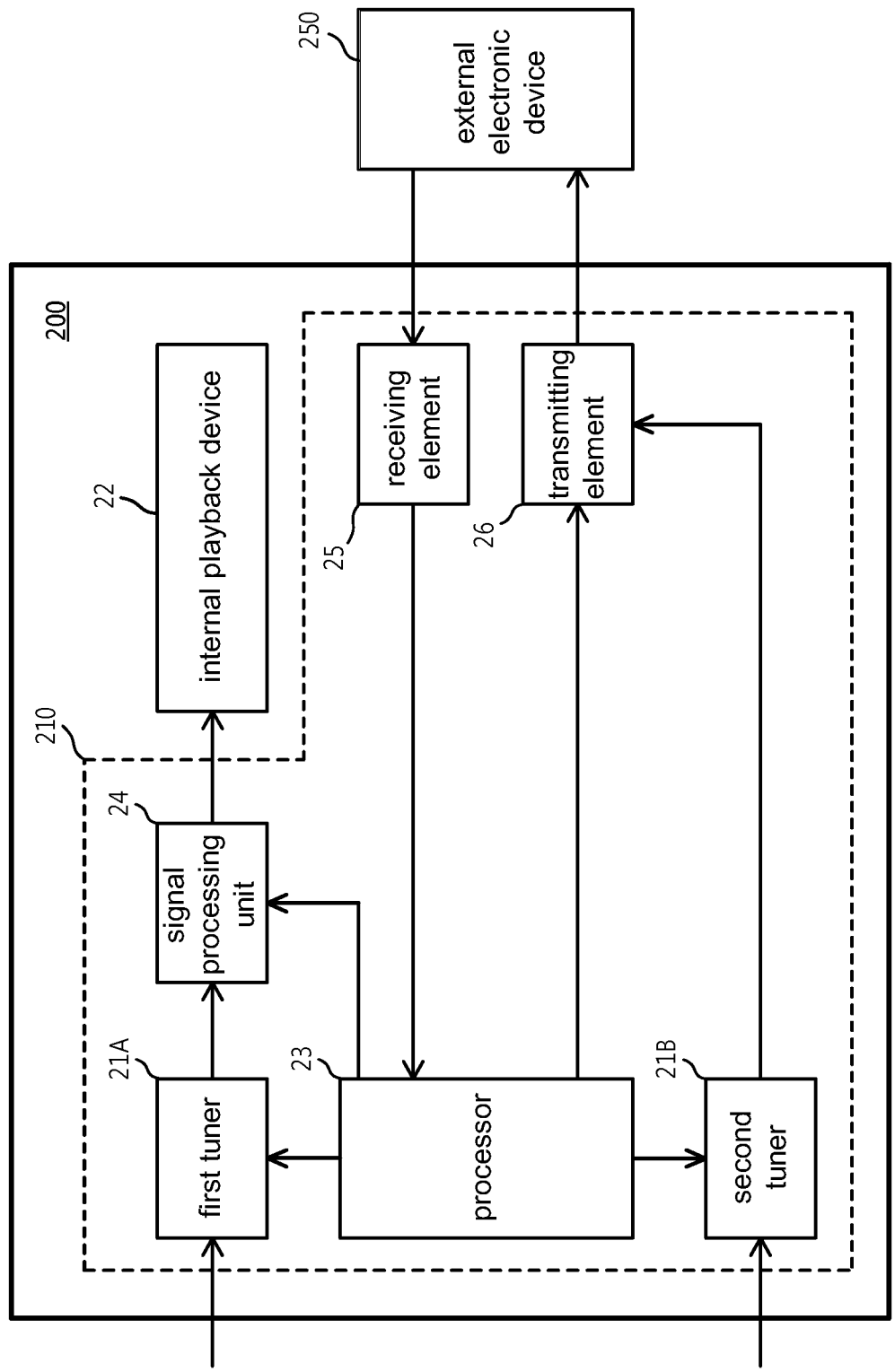
FIG. 2 to FIG. 4 are functional block diagrams of a television according to examples of the present invention.

FIG. 2 shows a functional block diagram of a data processing apparatus supporting simultaneous playback of multiple television channels according to an example of the present invention. A television 200 includes a data processing apparatus 210 and an internal playback device 22. The data processing apparatus 210 includes two tuners 21A and 21B, a processor 23, a signal processing unit 24, a receiving element 25 and a transmitting element 26. The television herein covers various apparatuses having analog, digital and/or network television signal receiving capabilities, e.g., set-up boxes (STB), over-the-top televisions (OTV), mobile communication devices and personal computers. In practice, the television 200 according to the present invention may be an independent unit, or may be integrated with more other functions to become a more powerful multimedia system. The internal playback device 22 refers to a playback device disposed inside the television system 200, and may be, but not limited to, a screen and a speaker.

In this example, the first tuner 21A and the second tuner 21B respectively receive television signals from outside the television 200. In practice, the television signals that the tuners 21A and 21B receive may be, but not limited to, a digital wired television signal, a digital wireless television signal, an analog wired television signal or an analog wireless signal. For example, the first tuner 21A may receive a digital wireless television signal, and the second tuner 21B may receive a digital wired television signal. In another example, signal input ends of the tuners 21A and 21B are coupled to each other, i.e., to receive the same external television signal. The frequency ranges of the signals the first tuner 21A and the second tuner 21B receive are controlled by the processor 23. It should be noted that, the technology of changing the frequency range of a signal that a tuner receives is generally known to one person having ordinary skill in the art, and shall be omitted herein. In the description below, an output signal of the first tuner is referred to first television data originally transmitted via a first frequency range, and an output signal of the second tuner is referred to second television data originally transmitted via second frequency range.

As shown in FIG. 2, the first tuner 21A collaborates with the internal playback device 22, and the second tuner 21B collaborates with the transmitting element 26. When a user wishes to view a first television channel using the internal playback device 22 and transmits an associated instruction through a remote controller or an external key (not shown) of the television 200, the processor 23 receiving this instruction first determines with which frequency range the first television channel is associated. In practice, data of multiple television channels may be transmitted via a same frequency range. Information of the frequency range associated with the television channel is usually disclosed in data that a service provider provides, and the processor 23 may accordingly determine the frequency ranges of different television channels. Assuming the processor 23 determines that the first television channel is associated with a first frequency range, the processor 23 controls the first tuner 21A to obtain the first television data transmitted via the first frequency range from the television signal. The first television data may include video/audio data, subtitle data, and other auxiliary data (e.g., electronic program guides) of multiple television channels.

The signal processing unit 24 is coupled between the first tuner 21A and the internal playback device 22. The processor 23 causes the signal processing unit 24 to retrieve the video/audio data of the first television channel from the first television data, and to apply demodulation, decoding or image optimization processes on the retrieved video/audio data. In other words, the signal processing unit 24 may include, but not limited to, a demodulating circuit, a decoding circuit, or an image processing circuit, or may include a memory unit required for these signal processes. The internal playback device 22 then plays the first television channel according to an output signal of the signal processing unit 24.

The receiving element 25 receives a data request from an external electronic device 250. It should be noted that, although the connection between the receiving element 25 and the external electronic device 250 is depicted by a solid line, signals may be transmitted by wireless means between the receiving element 25 and the external electronic device 250. For example, the receiving element 25 may be a wired network signal receiving port, a wireless network signal receiving port, an infrared receiver or a Bluetooth receiver. A format of the data request sent from the external electronic device 250 is associated with a transmission protocol between the receiving element 25 and the external electronic device 250. Further, for example, the external electronic device 250 may be various handheld mobile devices (e.g., mobile phones, laptop computers or tablet computers) having a video/audio playback function, or fixed electronic devices (e.g., desktop computers, multimedia apparatuses or another television).

When the user selects the external electronic device 250 to play a second television channel, the external television device 250 sends a data request for the selected television channel to the television 200. When the external electronic device 250 has known the channel range to which the second television channel belongs, the data request may be for the frequency range to which the second television channel belongs. Alternatively, the data request may be directly for the second television channel, and the processor 23 assists in determining which frequency range the second television channel belongs to. In response to the data request that the external device sends 250 for the second television channel or the second frequency range of the second television channel, the processor 23 controls the second tuner 21B to obtain the second television data transmitted via the second frequency range. Similarly, the second television data may include video/audio data, subtitle data and other auxiliary information (e.g., EPG) of multiple television channels.

Figure 3:
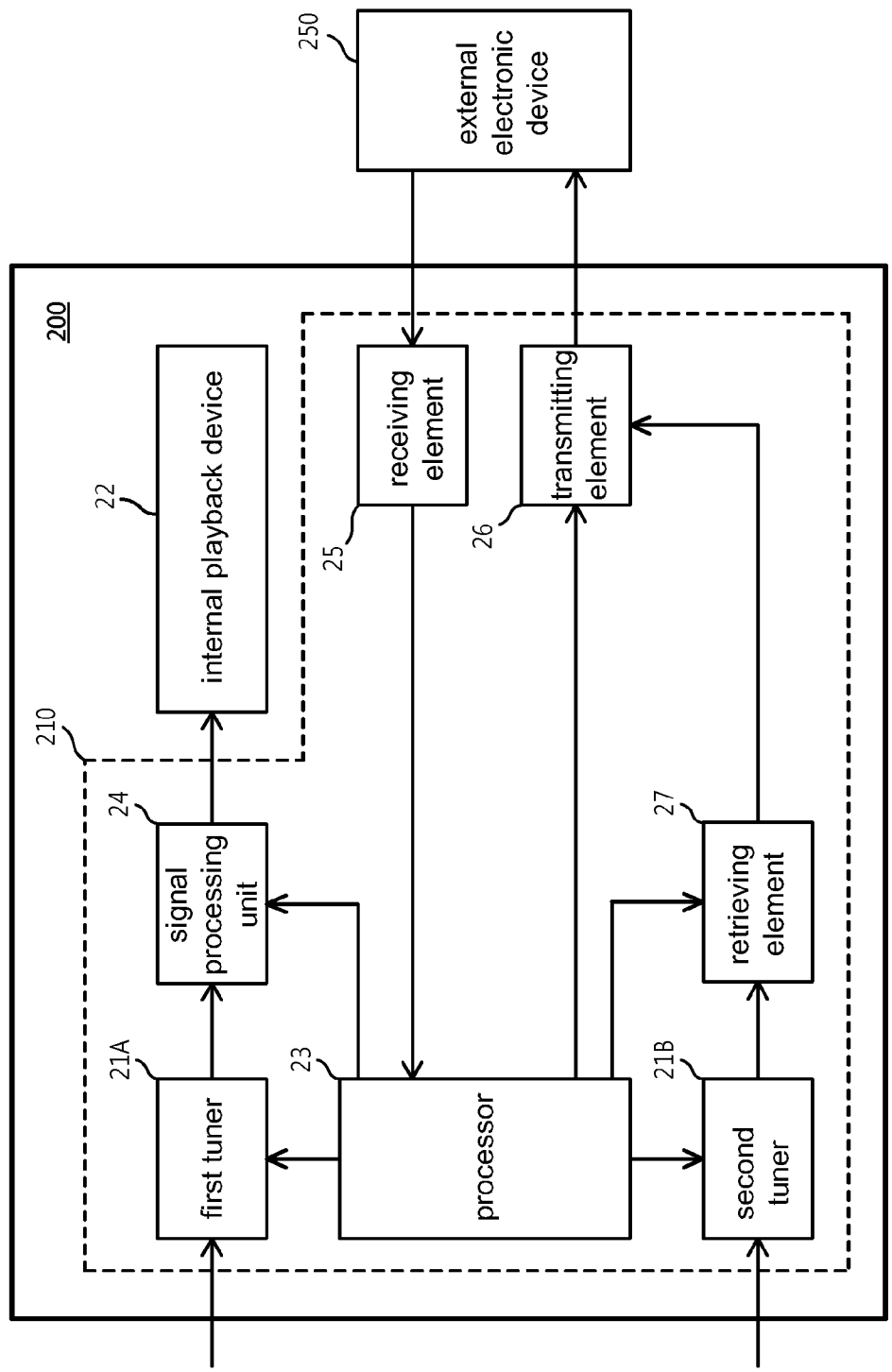

When the external electronic device 250 is capable of retrieving the video/audio data of the second television channel from the second television data, the processor 13 may control the transmitting element 16 to directly transmit the second television data outputted from the second tuner 21B to the external television device 250. Alternatively, as shown in FIG. 3, a retrieving element 27 may be further disposed between the second tuner 21B and the transmitting element 26. The retrieving element 27 is controlled by the processor 23, and retrieves the video/audio data of the second television channel from the second television data, i.e., filtering out data associated with other television channels. In the above situation, the data that the transmitting element 26 transmits to the external electronic device 250 is the video/audio data of the second television channel retrieved by the retrieving element 27. In another example, in addition to the video/audio data of the second television channel, the processor 23 may control the retrieving element 27 to further retrieve data associated with the second television channel (e.g., subtitle data or EPG). For example, the processor 23 may control the retrieving element 27 to retrieve the video/audio data and subtitle data of the second television channel from the second television data, and transmit the video/audio data and subtitle data of the second television channel to the external electronic device 250 by the transmitting element 26.

In another example, in the television 200, a circuit similar to the signal processing unit 24 may be further disposed between the second tuner 21B and the transmitting element 26.

In another example, the processor 23 further determines whether the data request from the external electronic device 250 includes data associated with the second television channel (e.g., subtitle data or EPG) in addition to the video/audio data of the second television channel. For example, the processor 23 further determines whether the data request from the external electronic device 250 includes the subtitle data of the second television channel. When the determination result is affirmative, in addition to the video/audio data of the second television channel, the processor 23 controls the retrieving element 27 to further retrieve the subtitle data of the second television channel from the second television data for the transmitting element 26. Or else, the processor 23 controls the retrieving element 27 to retrieve only the video/audio data of the second television channel from the second television data.

While the video/audio data of the first television channel is transmitted to the internal playback device 22, the television 200 may transmit the video/audio data of the second television channel to the external electronic device 250 via the transmitting element 26 for playing by the external electronic device 250. Although the connection between the transmitting element 26 and the external electronic device 250 is depicted by a solid line, signals may also be transmitted by wireless means between the transmitting element 26 and the external electronic device 250. For example, but not limited to, the transmitting element 26 may be a wired network signal transmitting port, a wireless network signal transmitting port, an infrared transmitter or a Bluetooth transmitter. In practice, when the receiving element 25 and the transmitting element 26 comply with same communication standard, the receiving element 25 and the transmitting element 26 may also be integrated into one single element having both receiving and transmitting capabilities. Given the receiving element 25 and the transmitting element 26 are implemented by a communication standard supporting a longer transmission distance, a user of the external electronic device 250 may perform control operations such as television channel switching at a location farther away from the television 200.

It is understood from the above description, as the tuners 21A and 21B are configured to receive television data of different frequency ranges, while the internal playback device 22 plays the video/audio data of the first television channel obtained through the first tuner 21A, the external electronic device 250 may simultaneously play the video/audio data of the second television channel obtained through the second tuner 21B. In other words, the internal playback device 22 and the external electronic device 250 are capable of respectively playing television programs of different channels at the same time.

In the above example, the processor 23 determines whether to control the second tuner to obtain the second television data transmitted via the second frequency range without considering whether the second frequency range and the first frequency range are the same. In other words, regardless whether the second frequency range is same as the first frequency range, the processor 23 controls the second tuner 21B to obtain the second data transmitted via the second frequency range from the television signal.

Figure 4:
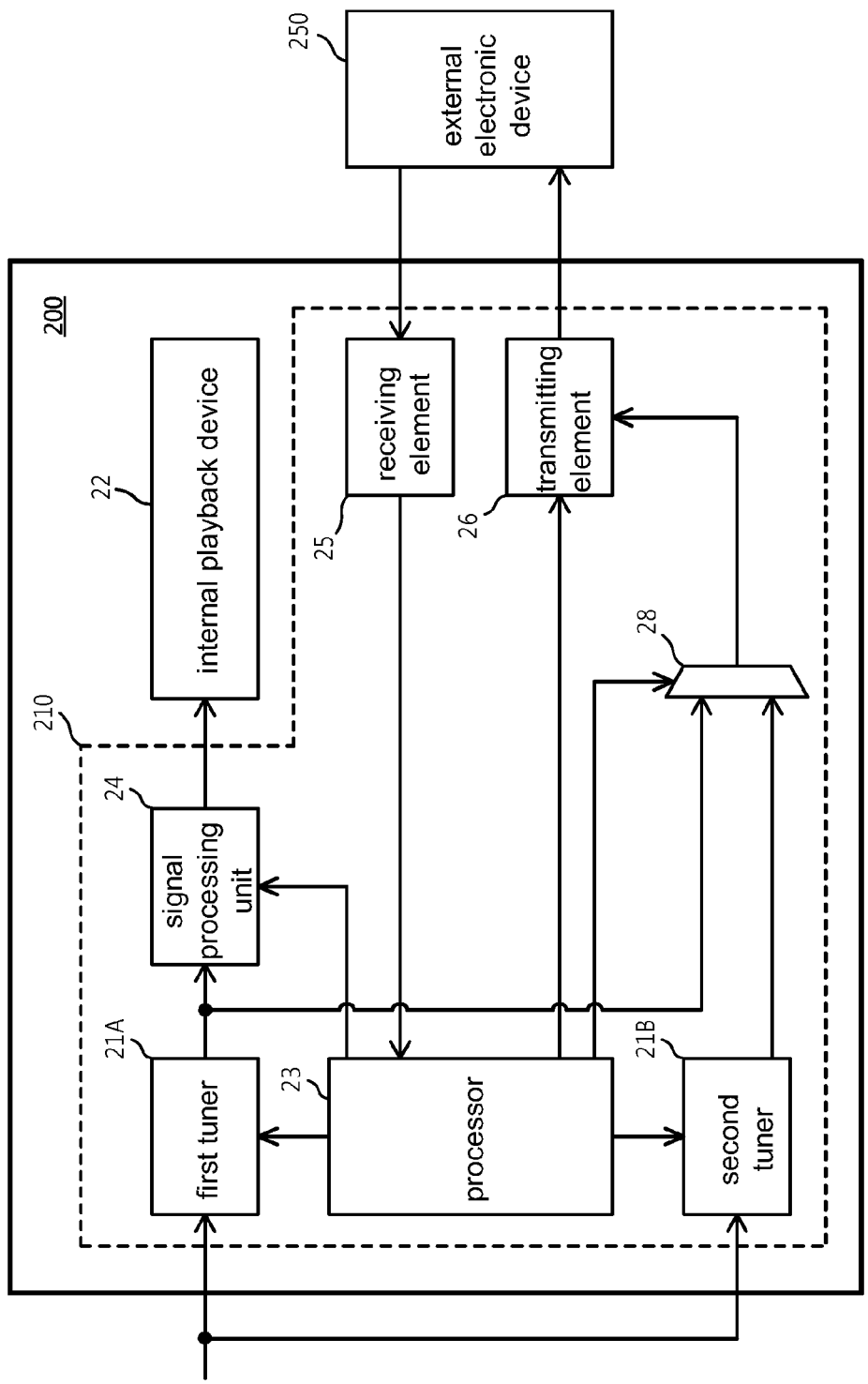

In a situation where the signal input ends of the first tuner 21A and the second tuner 21B are coupled to each other (i.e., to receive the same external television signal), when the television 200 receives the data request for the second television channel or the second frequency range to which the second television channel belongs from the external electronic device 250, the processor 23 may first determine whether the second frequency range is same as the first frequency range to accordingly determine whether to drive the second tuner 21B to receive the signal. As shown in FIG. 4, in this example, the television 200 further includes a multiplexer 28. Two input ends of the multiplexer 28 are respectively from output ends of the tuners 21A and 21B, and are controlled by the processor 23 to select which input signal is to be provided to the transmitting element 26. When the second frequency range is same as the first frequency range, the processor 23 may control the multiplexer 28 to provide the output signal of the first tuner 21A to the transmitting element 26 instead of also driving the second tuner 21B to receive the signal. In other words, only when having determined that the second frequency range is different from the first frequency range, the processor 23 controls the second tuner 21B to obtain the television data transmitted via the second frequency range, and controls the multiplexer 28 to provide the output signal of the second tuner 21B to the transmitting element 26.

In practice, the processor 23 may be implemented by various control and processing platforms, including fixed and programmable logic circuits, e.g., programmable logic gate arrays, application-specific integrated circuits, microcontrollers, microprocessor, and digital signal processors. Further, the processor 23 may be designed to complete its task through by executing instructions stored in a memory (not shown).

According to another example, a method supporting simultaneous playback of multiple television channels is provided. The method is applicable to a data processing apparatus including a first tuner and a second tuner. The method at least includes following steps. In step (a), first television data transmitted via a first frequency range is generated through the first tuner. In step (b), the first television data is provided to an internal playback device for playback. In step (c), second television data transmitted via a second frequency range is generated through the second tuner. In step (d), a data request for a selected television channel is received from an external electronic device. In step (e), in response to the data request for the selected television program, the second tuner is controlled to generate the second television data including video/audio data of the selected television channel. In step (f), when the internal playback device performs playback according to the first television data, the video/audio data of the selected television channel is transmitted to the external electronic device for playback.

Figure 5:
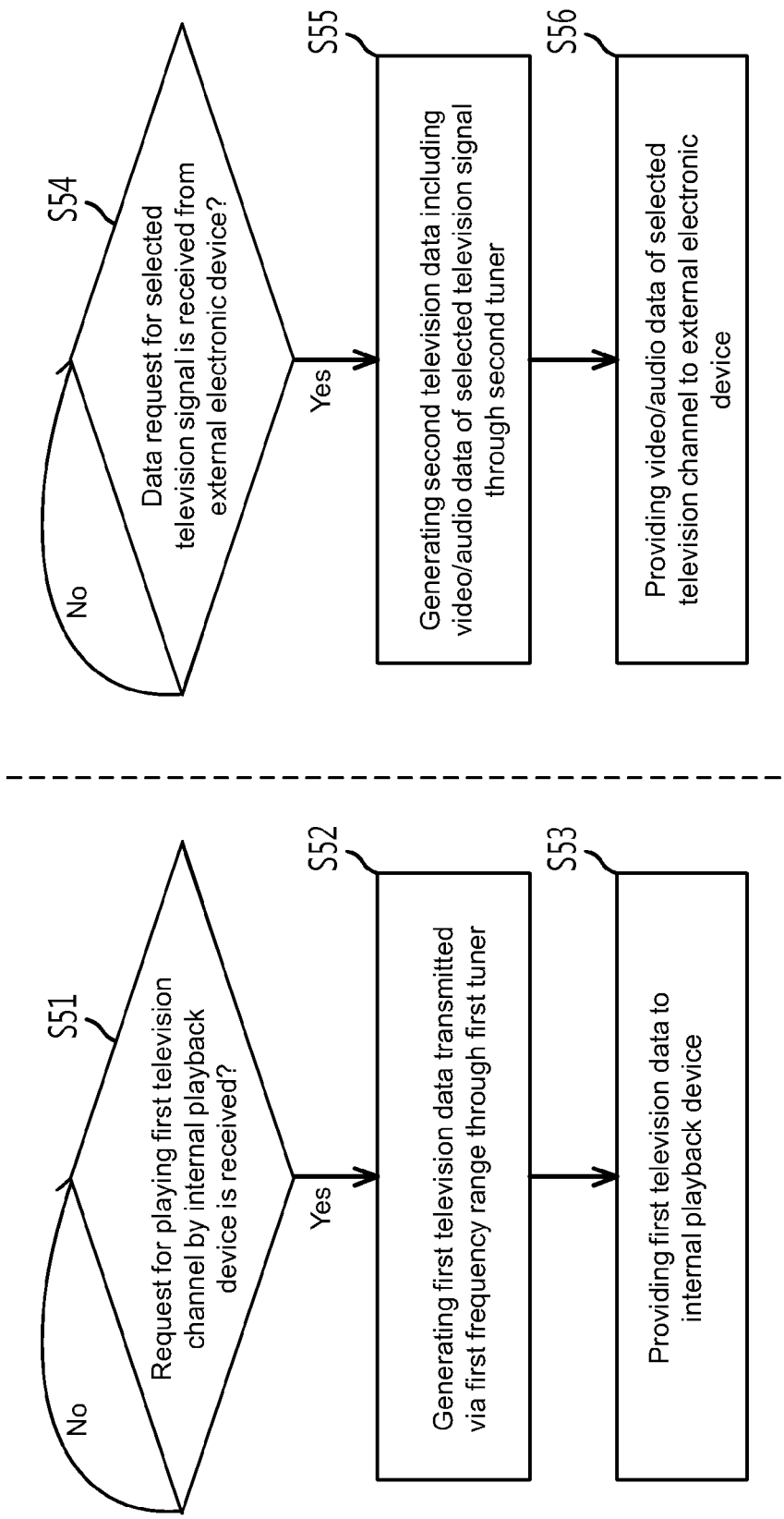
FIG. 5 to FIG. 7 are flowcharts of a method supporting simultaneous playback of multiple television channels according to examples of the present invention.

FIG. 5 shows an exemplary flowchart of the above method. In step S51, it is determined whether a request for playing a first television channel by an internal playback device is received. Step S51 is iterated when a determination result of step S51 is negative, or else step S52 is performed when the determination result of step S51 is affirmative. In step S52, first television data transmitted via a first frequency to which the first television channel belongs is generated through the first tuner, and video/audio data of the first television channel is included in the first television data. In step S53, the video/audio data of the first television channel is provided to the internal playback device. Similarly, in step S54, it is determined whether a data request for a selected television channel is received from an external electronic device. Step S54 is iterated when a determination result of step S54 is negative, or else step S55 is performed when the determination result of step S54 is affirmative. In step S55, second television data transmitted via the second frequency range is generated through the second tuner. The second television data includes video/audio data of the selected television channel. In step S56, the video/audio data of the selected television channel is provided to the external electronic device. It should be noted that, steps S51 to S53 and steps S54 to S56 are two sub-processes, which may be performed in parallel in a same period or performed in different periods.

Figure 6:
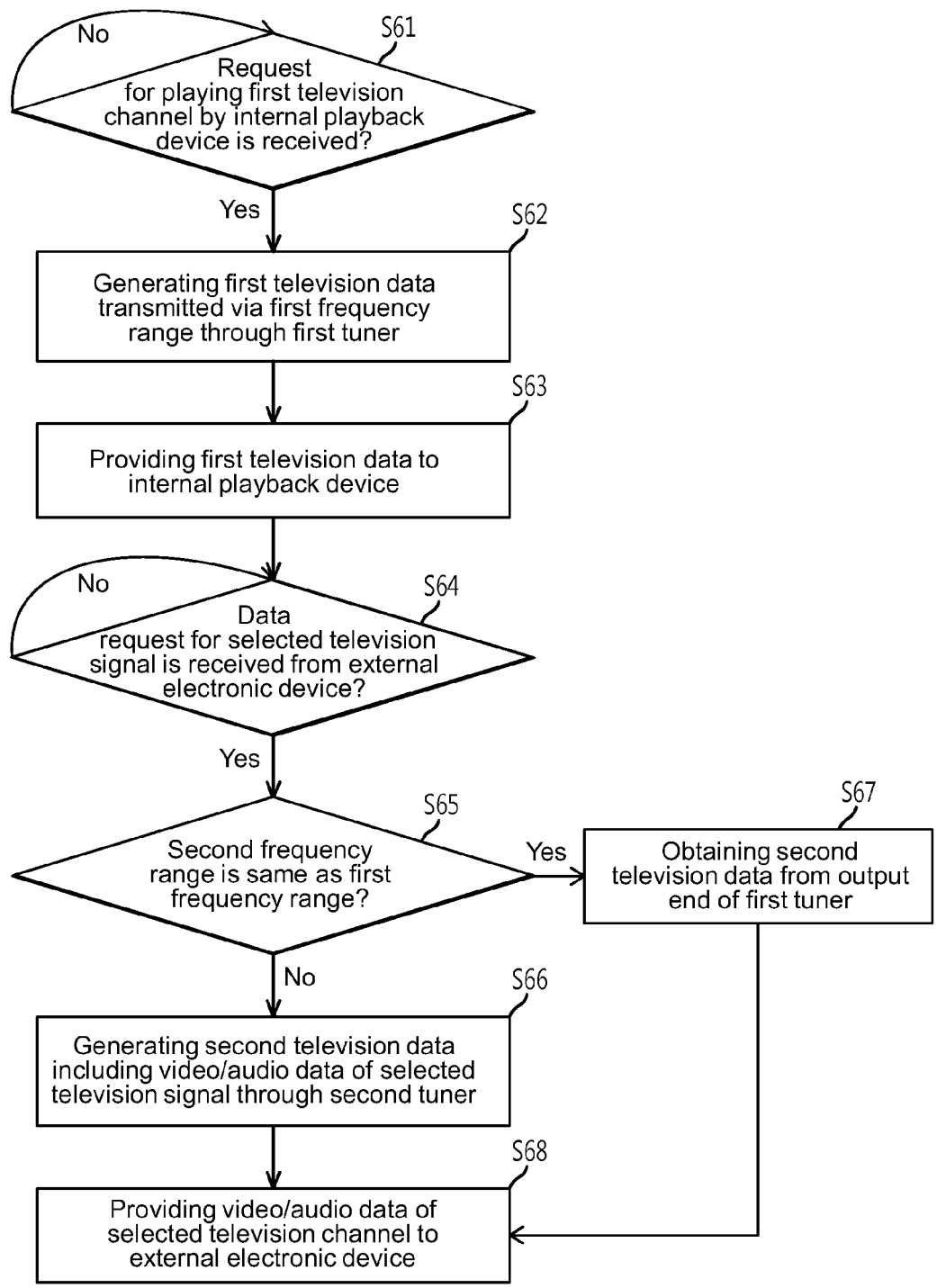

FIG. 6 shows another exemplary flowchart based on the above method. Steps S61 to S64 at the beginning are identical to steps S51 to S54 in FIG. 5. Differences between these two flowcharts are that, when a determination result of step S64 is affirmative, step S65 is first performed to determine whether the second frequency range is the same as the first frequency range. When a determination result of step S65 is negative, step S66 and step S68 are performed, in which the second television data transmitted via the second frequency range is obtained through the second tuner, and the video/audio data of the selected television channel included in the second television data is transmitted to the external electronic device. When the determination result of step S65 is affirmative, step S67 and step S68 are performed, in which the second television data is obtained from the output end of the first tuner, and the video/audio data of the selected television channel included in the second television data is transmitted to the external electronic device.

Figure 7:
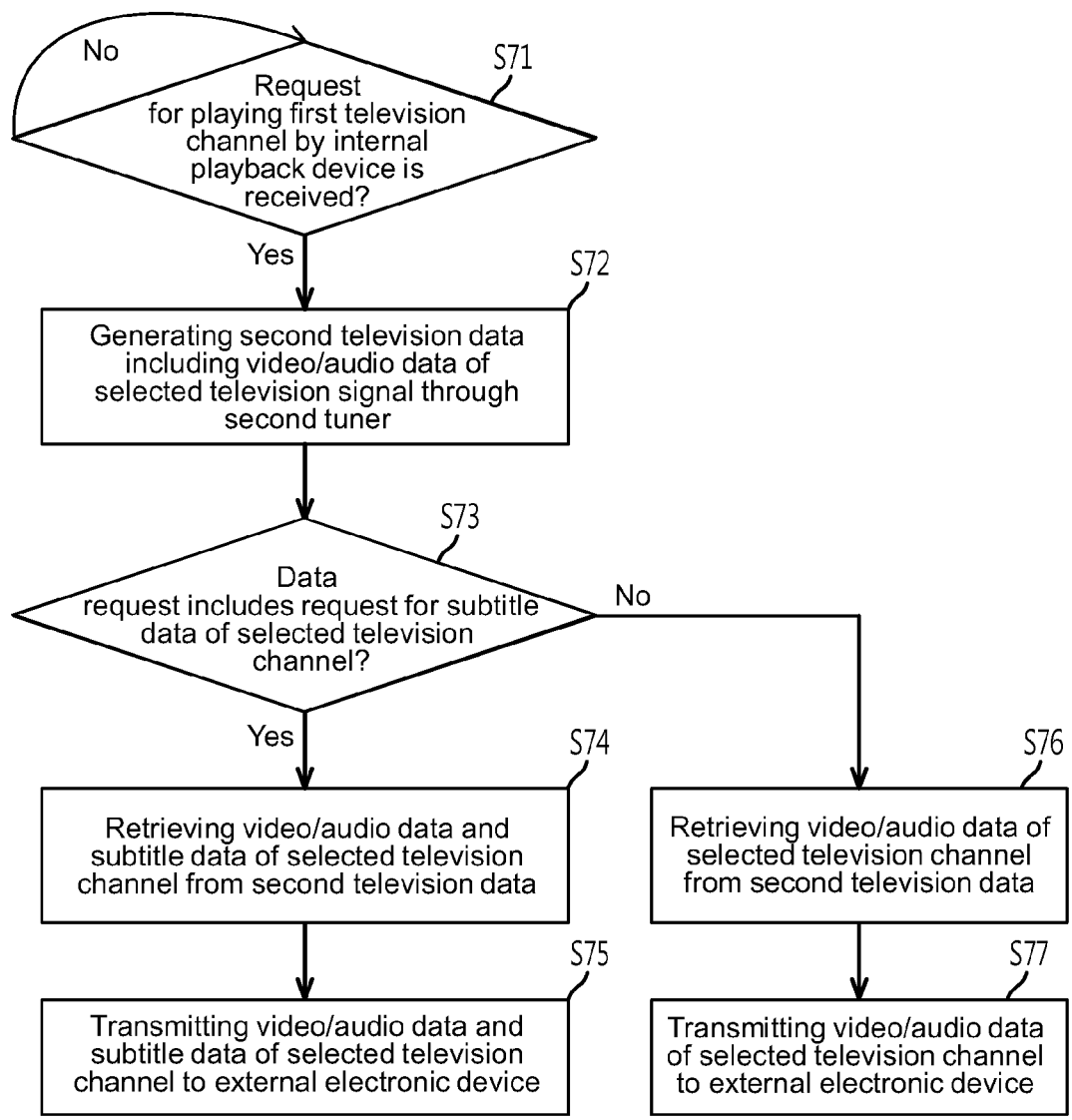

FIG. 7 shows an example of a variation from steps S54 to S56. Step S71 and step S72 at the beginning are identical to step S54 and step S55 in FIG. 5. In step S73, it is determined whether a data request sent from the external electronic device includes requesting for subtitle data of the selected television channel. When a determination result of step S73 is affirmative, step S74 and step S75 are performed, in which the video/audio data and subtitle data of the selected television channel is retrieved from the second television data, and the retrieved data is transmitted to the external electronic device. When the determination result of step S73 is negative, step S76 and step S77 are performed, in which the video/audio data of the selected television channel is retrieved from the second television data, and the retrieved data is transmitted to the external electronic device.

One person having ordinary skill in the art can understand that, the orders of some steps in FIG. 6 and FIG. 7 can be equivalently swapped or simultaneously performed without affecting overall effects of the methods. Variation details in the description associated with the television 200 are also applicable to the methods in FIG. 5 to FIG. 7, and shall be omitted herein.

While the invention has been described by way of example and in terms of the preferred examples, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A data processing apparatus supporting simultaneous playback, comprising:
    a first tuner, generating first television data transmitted via a first frequency range, and providing the first television data to an internal playback device for playback;
    a second tuner;
    a receiving element, receiving a data request for a selected television channel corresponding to a second frequency range from an external electronic device;
    a processor, determining whether the second frequency range is the same as the first frequency range, setting the first television data as the video/audio data of the selected television channel if the second frequency range is the same as the first frequency range, and if the second frequency range is different from the first frequency range controlling the second tuner to generate second television data to set as the video/audio data of the selected television channel; and
    a transmitting element, transmitting the video/audio data of the selected television channel to the external electronic device for playback.

2. The data processing apparatus according to claim 1, further comprising:
    a retrieving element, coupled between the second tuner and the transmitting element;
    wherein, the processor controls the retrieving element to retrieve the video/audio data of the selected television channel from the second television data in response to the data request for the selective television channel; the transmitting element transmitting the video/audio data of the selected television channel to the external electronic device for playback is the transmitting element transmitting only the video/audio data of the selected television channel that the retrieving element retrieves to the external electronic device for playback.

3. The data processing apparatus according to claim 1, wherein the processor further determines whether the data request from the external electronic device comprises requesting for subtitle data of the selected television channel; the data processing apparatus further comprising:
    a retrieving element, coupled between the second tuner and the transmitting element, controlled by the processor to retrieve the video/audio data of the selected television channel from the second television data, and to retrieve the subtitle data of the selected television channel from the second television data to the transmitting element according to a determination result indicating that the data request from the external electronic device comprises requesting for the subtitle data of the selected television channel.

4. The data processing apparatus according to claim 1, wherein the processor further determines whether the data request from the external electronic device comprises requesting for an electronic program guide (EPG) of the selected television channel; the data processing apparatus further comprising:
    a retrieving element, coupled between the second tuner and the transmitting element, controlled by the processor to retrieve the video/audio data of the selected television channel from the second television data, and to retrieve the EPG of the selected television channel from the second television data to the transmitting element according to a determination result indicating that the data request from the external electronic device comprises requesting for the EPG of the selected television channel.

5. A method supporting simultaneous playback, applicable to a data processing apparatus comprising a first tuner and a second tuner, the method comprising:
   a) generating first television data transmitted via a first frequency range through the first tuner;
   b) providing the first television data to an internal playback device for playback;
   c) receiving a data request for a selected television channel corresponding to a second frequency range from an external electronic playback device;
   d) determining whether the second frequency range is same as the first frequency range;
   e) setting the first television data as the video/audio data of the selected television channel if the second frequency range is the same as the first frequency range, and if the second frequency range is different from the first frequency range controlling the second tuner to generate second television data to set as the video/audio data of the selected television channel; and
   f) transmitting the video/audio data of the selected television channel to the external electronic device for playback.

6. The method according to claim 5, further comprising:
retrieving the video/audio data of the selected television channel from the second television data;
wherein, the step of transmitting the video/audio data of the selected television channel to the external electronic device for playback is transmitting only the retrieved video/audio data of the selected television channel to the external electronic device for playback.

7. The method according to claim 5, further comprising:
   f1) determining whether the data request from the external electronic device comprises requesting for subtitle data of the selected television channel;
   f2) retrieving the subtitle data of the selected television channel from the second television data according to a determination result that the data request from the external electronic device comprises requesting for the subtitle data of the selected television channel; and
   f3) transmitting the subtitle data of the selected television channel to the external electronic device.

8. The method according to claim 5, further comprising:
   g1) determining whether the data request from the external electronic device comprises requesting for an EPG of the selected television channel;
   g2) retrieving the EPG of the selected television channel from the second television data according to a determination result indicating that the data request from the external electronic device comprises requesting for the EPG of the selected television channel; and
   g3) transmitting the EPG of the selected television channel to the external electronic device.

* * * * *